March 11, 1941.  R. C. DAVIS ET AL  2,234,911
SEQUENCE CONTROLLER
Filed Dec. 29, 1939  3 Sheets-Sheet 3

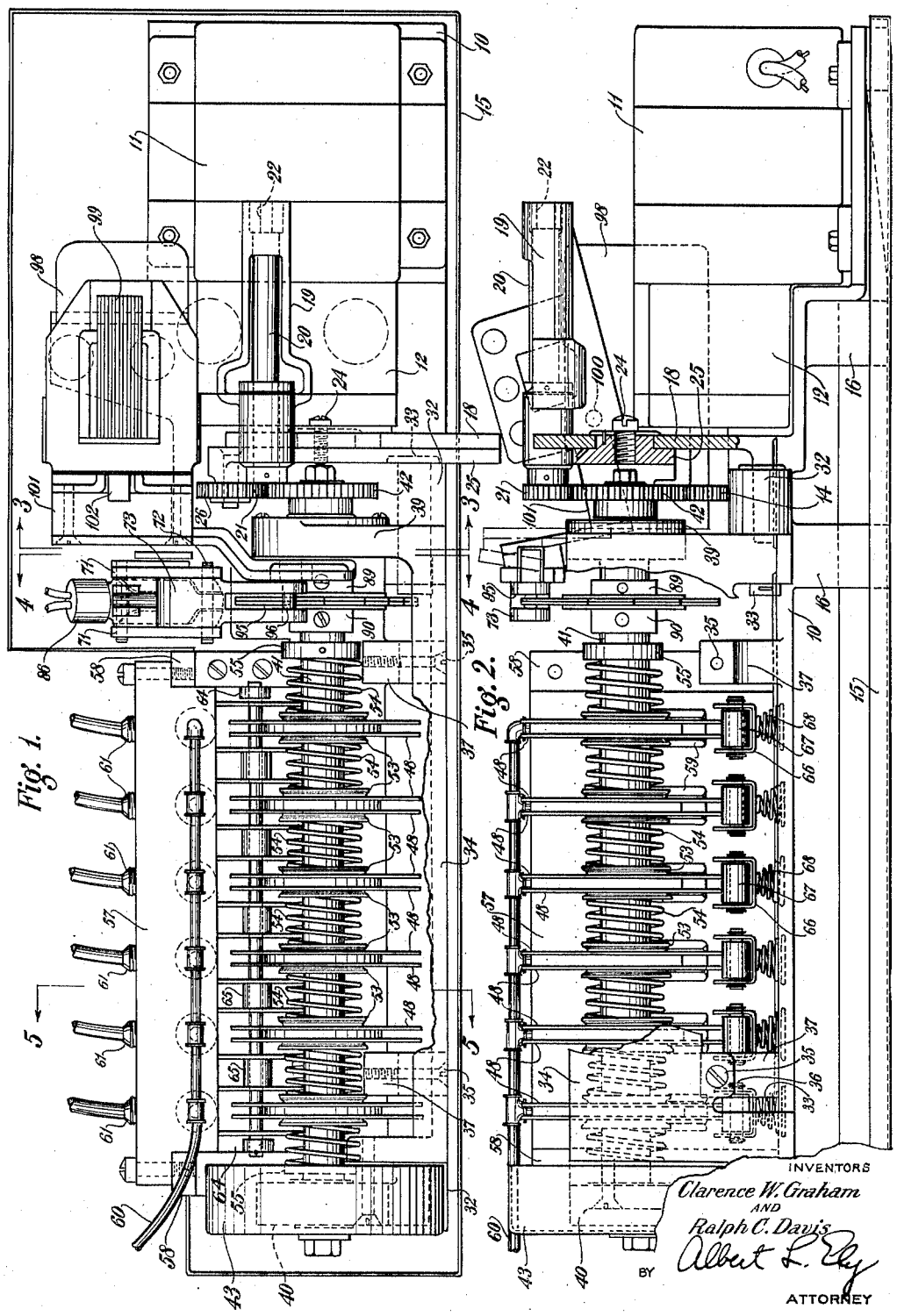

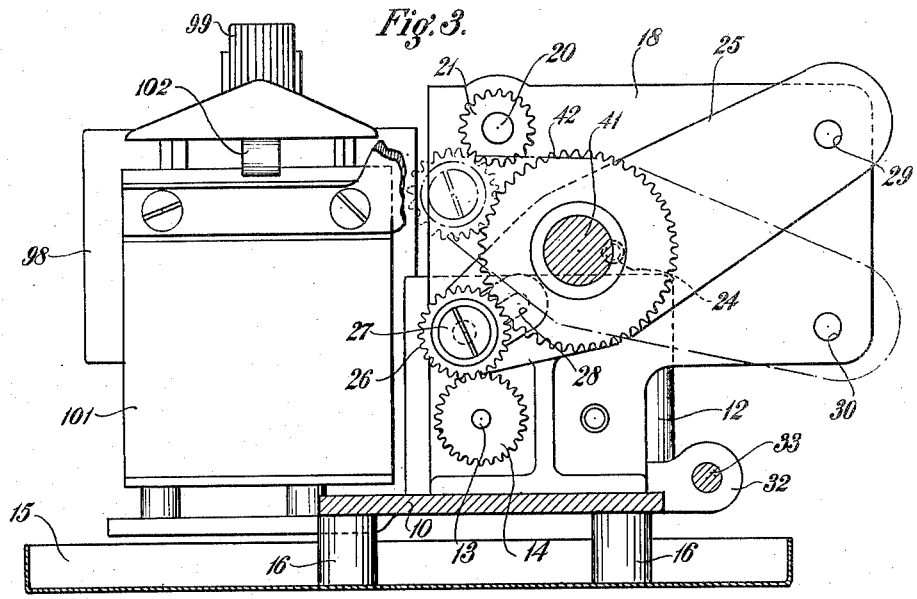

INVENTORS
Clarence H. Graham
AND
Ralph C. Davis
BY
Albert L. Ely
ATTORNEY

Patented Mar. 11, 1941

2,234,911

UNITED STATES PATENT OFFICE 2,234,911

SEQUENCE CONTROLLER

Ralph C. Davis, Akron, and Clarence W. Graham, Parma, Ohio, assignors to The Firestone Tire & Rubber Company, Akron, Ohio, a corporation of Ohio Application December 29, 1936, Serial No. 118,174

10 Claims. (Cl. 192—142)

This invention relates to sequence controllers, and more especially it relates to devices for mechanically operating a plurality of remote instrumentalities, such as fluid pressure operated valves, in determinate sequence.

The device is especially useful in association with a timing mechanism that controls the duration of the interval between successive operations to be performed. The timing mechanism may be of simple construction and arranged solely to make electrical connections momentarily at determinate time intervals, whereby electrical energy is communicated to the controller to actuate the same. However, such electrical connections may be effected manually if desired. During each period of operation the controller operates one of a series of relatively low pressure (about 50 lbs.) fluid-control valves, the latter being suitably connected to remote valve-controlled mechanism for performing operations upon material being processed. The device has been found to be of especial utility in the rubber industry for controlling one or more units of apparatus used in the vulcanization of pneumatic tire casings wherein heavy hydraulic pressure is used for closing the tire molds, steam pressure is used for heating the molds, and heated fluid under pressure is used for distending the tires within the molds.

The chief objects of the invention are to provide a controller of the character mentioned that may be actuated automatically or manually; that may be driven by electrical or mechanically operated means, or manually driven; that may be readily adjusted to alter the sequence of operations; that operates at relatively high speed thereby effecting quicker and more effective valve action; that includes cams that readily may be altered to vary the extent of their camming surfaces; and to provide cams that do not require to be accurate as to lift, thereby making it possible to produce the cams by a simple stamping operation. Other objects will be manifest as the specification proceeds.

Of the accompanying drawings:

Figure 1 is a plan view of a sequence controller embodying the invention, in its preferred form;

Figure 2 is a side elevation thereof, a portion being broken away for clearness of illustration;

Figure 3 is a section on the line 3—3 of Figure 1;

Figure 4 is a section on the line 4—4 of Figure 1;

Figure 5:
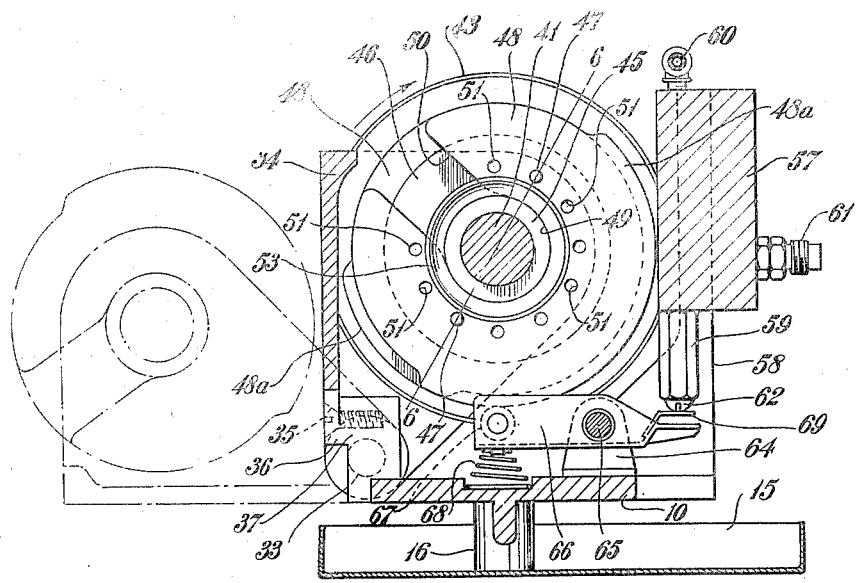
Figure 5 is a section on the line 5—5 of Figure 1.

Referring to the drawings, 10 is a base plate at one end of which is mounted an electric motor 11, the housing of the latter, at one end thereof, including a reduction gear device 12 from which extends a driven shaft 13 having a gear 14 mounted upon the end portion thereof. The base plate 10 is not constructed in a single plane, but portions thereof are offset from other portions. The base plate 10 is mounted upon a flat tray or supporting structure 15, and has short legs 16, 16 that are attached to said structure, said legs being of different lengths because of the offset character of different portions of the base plate.

Rising from the base plate 10, and disposed transversely thereof, is an integral vertical wall 18 against one side of which the motor and reduction gear housing abut. Formed integral with the wall 18, and extending laterally thereof, over the reduction gear housing, is an outboard bearing bracket 19 in which is journaled a shaft 20, one end of which is provided with a gear 21. The latter is disposed in the same vertical plane as the gear 14, on the opposite side of wall 18 from the bracket 19. The other end of shaft 20 is squared as shown at 22 to receive a hand crank (not shown) by means of which the shaft 20 may be rotated if desired. Obviously the shaft 20 might be provided with a pulley so that it could be belt driven. Pivotally mounted at 24, upon that side of wall 18 where gears 14 and 21 are positioned, is a lever arm 25, one end of which carries an idler pinion 26, the latter being journaled upon a short spindle 27 that is adjustably mounted in a slot 28 disposed longitudinally of the lever arm. The lever arm 25 is manually movable angularly about its pivot 24 so that idler pinion 26 alternatively is in mesh with motor driven gear 14, as shown in full lines in Figure 3, or in mesh with manually driven gear 21, as shown in broken lines in the same figure. The other end of lever arm 25 is formed with an aperture 29 that registers with one of a pair of apertures 30 formed in wall 18 when said lever arm is in either of its alternative positions. Any suitable pin or stud may be inserted through the registered apertures 29, 30 to retain the lever arm in desired position against the thrust of the meshed gears.

One side of the base plate 10 is formed with a pair of ears 32, 32 that carry respective hinge pins 33 upon which an angularly movable side-plate 34 is pivotally mounted, said side-plate normally being retained in vertical position by a pair of screws 35, 35 threaded through lugs 36, 36 formed on the side-plate and registering lugs 37, 37 formed on the base plate 10. Formed integral with the side-plate 34, at the end thereof nearest the wall 18, is a bearing bracket 39, and a somewhat similar bearing bracket 40 is secured to the opposite end of the side-plate by set screws or the like. Journaled in bearing brackets 39, 40 is a cam shaft 41, one end of which, beyond bracket 39, is provided with a gear 42. The arrangement is such that when side-plate 34 is in vertical, operative position, gear 42 is meshed with idler pinion 26, in either of the alternative positions of the latter, as shown in Figure 3, whereby cam shaft 41 is driven manually by means of shaft 20, or power driven by the motor 11. The speed of the latter and the gear reduction effected by the previously described gears is such that the cam shaft normally rotates at a speed of about 20 R. P. M. One revolution of the cam shaft 41 constitutes a cycle of operation, and the other end of cam shaft may be provided a drum-like structure 43 upon the perimeter of which suitable indicia may be placed to indicate at all times the angular position of the cam shaft as regards a cycle of operation.

Figure 6:
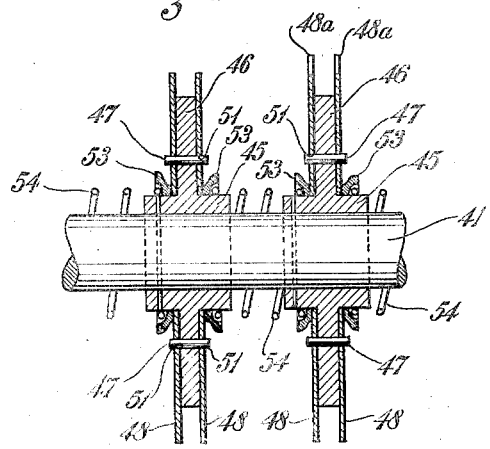
Figure 6 is a detail sectional view on the line 6—6 of Figure 5.

Mounted upon the cam shaft 41 at spaced points longitudinally thereof are cam supports herein shown as six in number although a greater or fewer number may be provided if desired. As best shown in Figure 6, each of said cam supports comprises a hub portion 45 that is pinned to the cam shaft, and an integral, centrally disposed, outwardly extending circumferential flange 46 that has two pins or dowels 47, 47 mounted therein at diametrically opposite points, each of said dowels projecting laterally from the lateral faces of said flange. Mounted upon each hub 45 in laterally abutting relation to opposite lateral faces of its flange 46 are cam plates 48, 48. As shown in Figure 5, each of said cam plates 48 is formed with an axial aperture 49 of such diameter as to fit slidingly upon a hub 45, there being a radial slot 50 extending from aperture 49 to the perimeter of the cam plate. Slot 50 is slightly wider than the diameter of cam shaft 41 so that the cam plates may be mounted by sliding them over the cam shaft until their apertures 49 are aligned with hubs 45, and then moving them axially until they are positioned upon the hubs, against flanges 46. Each cam plate is formed with a concentric series of apertures 51, 51, herein shown as 30 degrees apart and arranged to receive one or both dowels 47 projecting from the flange 46. The arrangement is such as to provide for mounting the cam plates in determinate angular positions relatively of the cam shaft and relatively of each other, and to prevent angular movement of the cam plates relatively of the cam shaft. For restraining the cam plates 48 against axial movement upon the hubs 45, dished washers 53 are slidably mounted upon the latter and are yieldingly urged axially against the outer lateral face of each cam plate 48 by compression springs 54, 54 mounted upon the cam shaft and engaging said washers 53. Collars 55, 55 are mounted on the cam shaft at each end of the bank of cams for engagement with the compression springs that engage the end cam plates. The washers 53 may be moved axially, against the pressure of the springs 54, when it is desired to remove a cam plate or to alter the angular position thereof. The mounting and adjustment of the cam plates is facilitated by the hinged arrangement of the side-plate 34 which permits it to be tilted to the position shown in broken lines in Figure 5 when desired.

The two cam plates 48 on each hub 45 constitute a single cam element and operate as a unit upon a single instrumentality presently to be described. Each cam plate shown in Figure 5 comprises a raised peripheral camming surface 48a that is a little less than 180° in extent. By positioning two of the cam plates 48 in non-alignment angularly, their combined camming surfaces 48a may be nearly 360° in extent. Other cam plates having cam surfaces of various lengths less than 180° may be provided, and if the cam action desired is less than 180°, it is possible that camming action may be obtained by the use of but one cam plate. The arrangement is advantageous, however, in making it possible to obtain any length of cam action desired with relatively few cam plates.

The cam units described operate respective fluid pressure valves. The latter are mounted in a block 57 that is mounted upon a pair of upright bracket arms 58, 58 secured to the base plate 10 at the opposite margin thereof from the side plate 34. Part of the valve mechanism is in the block 57, and part in respective sleeves, such as the sleeve 59, Figure 5, that are mounted in the block 57 and projected downwardly from the bottom side thereof. Fluid pressure for the respective valve mechanism is delivered through a common inlet pipe 60 that communicates with the valves through the top thereof. Delivery connections 61, 61 for the respective valves project from the rear face of the block 57, said connections being adapted to be coupled to pipes (not shown) extending to remote instrumentalities to be operated by pressure controlled by the valves. Each of the valves comprises an operating plunger 62, Figure 5, that projects from the lower end sleeve 59, and said plunger is formed with an end slot to receive a screw driver or other tool by which it may be rotated. The plunger is threaded into an internal valve member, so that by rotating the plunger the distance that it projects beyond the sleeve 59 may be varied. This construction is advantageous in that adjustment of the valve is provided, and extreme accuracy in the lift of the cams is not required.

In order to operate the respective valves from the cam units, each bracket 58 is formed at its base with an upstanding, apertured ear 64, and supported at its ends by said ears is a rod 65. The latter supports a plurality of cam arms 66, 66 that are pivotally mounted thereon near the middle of their respective structures. One end of each arm 66 is disposed beneath a cam unit and carries a cam roller 67 that yieldingly is urged toward the perimeter of the cam plates 48 by a compression spring 68 positioned upon the base plate 10 beneath the end of said arm. The opposite end of each cam arm 66 is positioned beneath the sleeve 59 of a valve, and carries a leaf spring 69 that is in contact with the lower end of valve plunger 62 when cam-elevation 48a is in engagement with cam roller 67, as shown in Figure 5. In this position of the respective elements, the valve is operating to discharge fluid pressure from the connection 61. The valve closes when the cam arm 66 tilts by reason of the cam roller 67 being in engagement with a region of the cam unit where the low portions of two cam plates are coincident.

The cam shaft 41 rotates intermittently by reason of intermittent rotation of the motor 11. Operation of the latter is controlled by a tiltable mercury switch that is in the power circuit of the motor, said switch being normally open, but being closable to start the motor, and being retained in closed position until opened by means carried by the cam shaft after the latter has rotated a determinate angular distance.

To this end a pair of parallel, spaced apart plates 71, 71 are mounted upon the base plate 10, rearwardly of the cam shaft 41, and fixed in the top of said plates and spanning the space between them is a pin 72 upon which is mounted a slide bolt 73, the latter being formed with a longitudinally extending slot 74 through which the pin 72 extends. The rear end of slide-bolt 73 is formed with an axial stem 75, the end portion of which carries a transverse stud 76 that extends laterally from opposite sides of the stem and engages in respective parallel arcuate slots 76a formed in a forked lever 77 that is pivotally mounted between the plates 71 upon a rock shaft 78. The latter projects laterally of one of the plates 71 and carries a downwardly projecting rocker arm 79 that has its free end provided with a laterally projecting stud 80 that engages in a slot 81 formed in one end of a lever 82. Said lever 82 is pivotally mounted at 83, adjacent the outer face of one of the plates 71, and has its other end connected to a tension spring 84, the other end of the latter being connected to a fixed point on the base plate 10. The spring 84 is so arranged as normally to urge the slide bolt 73 toward the left as shown in Figure 4. The pivot point 83 of lever 82 is a rocker arm that is journaled in the plates 71, and between said plates carries a supporting structure 85, said supporting structure having a mercury switch 86 mounted thereon. Said switch has two angular positions according to the angular position of lever 82, namely, the position shown in full lines in Figure 4, in which the switch is open, and the position shown in broken lines therein in which the switch is closed. In the latter position the motor circuit is closed and the motor 11 will be driven.

For stopping the operation of the motor, means is provided for moving the slide bolt 73 to the right as shown in Figure 4, against the tension of spring 84, for the purpose of tilting the switch 86 from the broken line position in said figure to the position shown in full lines therein. To this end a flanged collar 89 is fixedly mounted upon cam shaft 41 and beside it on said shaft is mounted a laterally movable flanged collar 90. The flange of collar 89 is provided with a concentric series of dowels 91, 91 arranged 30 degrees apart and projecting laterally toward the flange of collar 90, the latter flange being suitably apertured between said dowels. Mounted between said collar flanges are sector shaped elements of the same number as the dowels 91, each of said elements being formed with an aperture in which one dowel is receivable for the purpose of retaining said elements in place. Said sector shaped elements may have an arcuate surface concentric with the axis of cam shaft 41, as shown on the elements designated 92, or this portion of the element may be angular, as shown on elements designated 93, so that a succession of said elements present a serrated effect. It is the elements 93 that cause a tilting of the switch 86, and these elements may be arranged in proper succession to effect the desired sequence of motor stops during each cycle of operation of the controller. The elements 93 are arranged in determinate relation to the angular positions of the several cam units so that the units may have the required dwell to hold their respective cams open for the desired interval.

The other end of the slide bolt 73 from the stem 75 is slotted at 95, and a pin 96 mounted in the end portion of the slide bolt traverses said slot. Since the slide bolt is pivotally mounted, the pin 96 will rest upon the perimeter of the structure composed of the segments 92, 93, said segments being in alignment with the slot 95. The shaft 41 rotates in the direction indicated by the arrows in Figure 4, with the result that segments 92 slide smoothly under the pin 96. The segments 93, however, normally will not pass under the pin 96, but engage the latter in the manner of a ratchet and pawl, and force the slide bolt 73 longitudinally, to the right as viewed in Figure 4, with the result that switch 86 is tilted to the full line, open position shown in said figure, the circuit to the motor 11 is broken, and the latter stops running. The cam shaft consequently stops rotating, the slide bolt preventing coasting movement thereof. This condition obtains until it is again desired to start the motor, the latter operation being effected by the lifting of the slotted end of the slide bolt 73 sufficiently for the pin 96 to clear the member 93, as shown in broken lines in Figure 4, whereupon the spring 84 acting through the mechanism previously described, will move the slide bolt to the left until it reaches its normal position, and concurrently will tilt the switch 86 to its closed position.

The lifting of the slotted end of the slide bolt is effected by electrical energy, and to this end a solenoid 98 is mounted upon the base plate 10 beside the reduction gear device 12. Said solenoid comprises a U-shaped core 99 that has one leg thereof pivotally mounted at 100 (Fig. 2) upon a stationary frame member of the solenoid, and a rectangular weight member 101 is so attached to the pivoted leg of said core 99 as normally to tilt the same to the angular position shown most clearly in Figure 2. A leaf spring 102 that bears against the upper edge of member 101 also urges the core 99 to the tilted position shown. Secured to the front face of weight member 101, at the top thereof, is a release arm 103 that extends somewhat upwardly and laterally in a direction transversely of the cam shaft 41, the free end portion of said arm being disposed beside the slide bolt 73. The free end of arm 103 is formed with an elongate slot 104, and engaged in said slot is an end portion of pin 96 that projects laterally from said slide bolt, said pin sliding freely in said slot during the reciprocating movement of the slide bolt previously described. When the solenoid 98 is energized by electric energy passing therethrough, that leg of its core 99 that is disposed interiorly of its structure is drawn downwardly, with the result that the weight member is tilted to vertical position and the release arm 103 is lifted. Actuation of the solenoid is effected only when the motor is idle and the slide bolt is in the position shown in full lines in Figure 4. Lifting of the release arm 103 raises the slotted end of slide bolt 73 and moves pin 96 out of engagement with the tooth-segment 93, with the result that spring 84 restores the slide bolt 73 to its alternative position and concurrently tilts the mercury switch 86 to the broken line position of Figure 4, thereby closing the circuit to the motor 11 whereby the latter is driven.

The motor continues to run and rotates the cam shaft 41 until a succeeding tooth member 93 engages pin 96 and stops the motor as previously described. The completion of a cycle of operation occurs when the cam shaft has made one complete revolution and all the fluid pressure valves have been actuated in proper sequence.

Although a complete cycle of operation may require as long as two hours, the angular movement of the cams during intervals that the motor is running is relatively fast, with the result that there is relatively quick valve action which results in more efficient operation of the valves. The feature of mounting the cam shaft and cams on a tiltable plate makes the cams more accessible for changing, and the feature of having two cam plates constitute a single cam makes it possible easily to alter the device to obtain any cam action desired. The invention conserves electric current, it may be electrically, mechanically, or manually operated, and it achieves the other objects set out in the foregoing statement of objects.

Modification may be resorted to without departing from the spirit of the invention or the scope of the appended claims.

What is claimed is:

1. In a sequence controller, the combination of a motor, a cam shaft driven thereby, cam units on said cam shaft, mechanisms operated in determinate sequence by said cam units, and selectively positionable means for stopping the drive of the motor after the cam shaft has rotated a determinate part of one revolution.

2. In a sequence controller, the combination of a motor, a cam shaft driven thereby, cam units on said cam shaft, mechanism operated in determinate sequence by said cam units, and selectively positionable means carried by the cam shaft for stopping the drive of the motor after the cam shaft has rotated a determinate part of one revolution.

3. In a sequence controller, the combination of a motor, a cam shaft driven thereby, cam units on said cam shaft, mechanism operated in determinate sequence by said cam units, a toothed structure carried by said cam shaft and rotated thereby, the respective teeth of said structure being arranged in determinate position with relation to said cam units, means engageable with the respective teeth of said structure and movable thereby, and means operated by the movement of said last mentiond means for stopping the drive of the motor.

4. A combination as defined in claim 3 in which the means engageable with the toothed structure is so constructed and arranged as to prevent coasting of the cam shaft after being moved a limited distance by the latter.

5. In a sequence controller, the combination of a motor, a cam shaft driven thereby, cam units on said cam shaft, a ratchet-like structure carried by said cam shaft and having teeth determinately positioned with relation to the cam units, a slidable member engageable with respective teeth of said ratchet structure so as to be moved thereby, a switch in the electrical circuit that drives the motor, and means for utilizing the movement of the slidable member to open said switch to stop the drive of the motor as the cam shaft rotates determine fractions of a revolution.

6. A combination as defined in claim 5, including means for disengaging the slidable member from the ratchet structure to effect starting of the motor drive.

7. In a sequence controller, the combination of a motor, a cam shaft driven thereby, cam units on said cam shaft, a ratchet-like structure carried by said cam shaft and having teeth determinately postionable with relation to the cam units, a slidable member engageable with respective teeth of said ratchet structure so as to be moved thereby, a switch controlling the drive of the motor, means whereby movement of the slidable member, under impetus of the ratchet member, opens said switch to stop the motor, an electrical solenoid having a movable armature, and means for utilizing movement of said armature, when the solenoid is energised, for disengaging the slidable member from the ratchet member and for concurrently closing said switch to start the motor.

8. A sequence controller comprising a cam shaft, a motor for driving the same, means for stopping rotation of the cam shaft after it rotates determinate parts of one revolution, said means comprising a ratchet consisting of a plurality of selectively positionable radial segments, and means engageable with said ratchet and movable thereby for stopping the drive of the motor, said means also preventing coasting of the cam shaft.

9. A sequence controller comprising a cam shaft and means for driving the same, means for stopping rotation of the cam shaft in determinate angular positions, said means comprising a disc-like structure made up of a plurality of radial segments of which some are formed with a single tooth, said segments being selectively positionable relatively of each other to form a ratchet device with teeth arranged either consecutively or in circumferentially spaced relation, and means engageable with the ratchet teeth and movable thereby for stopping the cam shaft device.

10. A combination as defined in claim 9 in which the ratchet segments are positioned between two flanged collars on the cam shaft, one of said flanges having a circumferential series of dowels projecting laterally therefrom, each ratchet segment being formed with an aperture in which one of said dowels is receivable for retaining the segment against radial displacement.

RALPH C. DAVIS.
CLARENCE W. GRAHAM.

CERTIFICATE OF CORRECTION.

Patent No. 2,234,911. March 11, 1941.

RALPH C. DAVIS, ET AL.

It is hereby certified that error appears in the above numbered patent requiring correction as follows: In the heading to the drawings, sheets 1, 2, and 3, line 3, for "Filed Dec. 29, 1939" read --Filed Dec. 29, 1936--; page 4, second column, line 10, claim 5, for "determine" read --determinate--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.